(12) United States Patent
Ruf (10) Patent No.: US 7,747,265 B1
(45) Date of Patent: *Jun. 29, 2010

(54) INITIATING A WIRELESS COMMUNICATION SESSION FROM CONTACT INFORMATION ON A COMPUTER

(75) Inventor: Michael P. Ruf, Parkland, FL (US)

(73) Assignee: Core Mobility, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/970,467

(22) Filed: Jan. 7, 2008

Related U.S. Application Data (63) Continuation of application No. 10/865,576, filed on Jun. 10, 2004, now Pat. No. 7,317,919.

(51) Int. Cl.
*H04W 4/00* (2009.01)

(52) U.S. Cl. .................. 455/466; 455/416; 455/419; 455/455; 455/414.1; 370/261; 379/202.01

(58) Field of Classification Search .......... 455/415–416, 455/428, 422.1, 426.1, 414.1–414.3, 445, 455/517, 418–420; 370/259–269, 352; 709/206–207, 709/203, 227; 379/201.01–205.1, 158, 93.21; 348/14.1, 14.3, 14.08–14.09, 211.12, 211.2; 715/751, 753, 756
See application file for complete search history.

(56) References Cited

U.S. PATENT DOCUMENTS

| | | | |
|---|---|---|---|
| 5,430,791 A | 7/1995 | Feit et al. | |
| 6,275,575 B1* | 8/2001 | Wu | 379/202.01 |
| 6,311,211 B1 | 10/2001 | Shaw et al. | |
| 6,477,240 B1 | 11/2002 | Lim et al. | |
| 7,149,208 B2* | 12/2006 | Mattaway et al. | 370/352 |
| 7,317,919 B1* | 1/2008 | Ruf | 455/446 |
| 2002/0098831 A1 | 7/2002 | Castell et al. | |
| 2003/0118160 A1 | 6/2003 | Holt et al. | |
| 2004/0214558 A1* | 10/2004 | Chang et al. | 455/416 |
| 2004/0235520 A1 | 11/2004 | Cadiz et al. | |
| 2004/0266490 A1* | 12/2004 | Silver | 455/567 |
| 2004/0268263 A1 | 12/2004 | Van Dok et al. | |
| 2005/0034079 A1 | 2/2005 | Gunasekar et al. | |
| 2005/0107074 A1* | 5/2005 | Zellner | 455/415 |
| 2006/0010197 A1 | 1/2006 | Ovenden | |
| 2006/0035629 A1* | 2/2006 | Kodama et al. | 455/415 |
| 2006/0058012 A1* | 3/2006 | Caspi et al. | 455/415 |
| 2006/0177034 A1 | 8/2006 | Reding et al. | |
| 2006/0203750 A1 | 9/2006 | Ravikumar et al. | |
| 2006/0227957 A1 | 10/2006 | Dolan et al. | |
| 2006/0250987 A1 | 11/2006 | White et al. | |
| 2007/0036127 A1 | 2/2007 | Roosen et al. | |
| 2007/0047516 A1 | 3/2007 | Kottilingal | |
| 2007/0081654 A1 | 4/2007 | Toy et al. | |

\* cited by examiner

*Primary Examiner*—Kamran Afshar
(74) *Attorney, Agent, or Firm*—Workman Nydegger (57) ABSTRACT

A communication session between a wireless communication device and one or more recipient communication devices is initiated in response to user input received at a separate computing device. The intended parties of the call are identified at the computing device in response to the user input. Once the intended parties have been identified, the calling instructions are generated and transmitted to the wireless communication device or a server, which cause a call to be initiated between a wireless communication device and one or more recipient communication devices. This allows a caller to utilize the functionality and resources available on a computer to initiate a call, while enabling the caller to utilize the functionality and resources available on the caller's wireless communication device to engage in and complete the call, without requiring the caller to communicate through the telephony applications of a computer.

36 Claims, 4 Drawing Sheets

INITIATING A WIRELESS COMMUNICATION SESSION FROM CONTACT INFORMATION ON A COMPUTER

RELATED APPLICATION

This application is a continuation of U.S. patent application Ser. No. 10/865,576, filed on Jun. 10, 2004, which is incorporated herein by reference.

BACKGROUND OF THE INVENTION

1. The Field of the Invention

The present invention is directed to wireless communications and, more particularly, to the initiation of wireless communication sessions.

2. The Relevant Technology

Advances in wireless communications have helped to extend the capabilities and popularity of wireless communication devices, such as wireless telephones. However, despite the conveniences and utility provided by existing wireless communication devices, there are still certain constraints that can sometimes limit their use. For example, the restricted memory capacity of some wireless communication devices or the difficulty of synchronizing with the user's remote contacts directory can effectively prevent a complete telephone directory from being stored on wireless devices. In such circumstances it may be necessary to access a contact directory that is stored in another place, such as a personal computer, or a telephone book or other contact list in order to find a telephone number or URI that is necessary to initiate a communication session. Reference to the term "communication session" herein includes, but it is not limited to communication over a network, such as telephone call over a cellular network, over the Public Switched Telephone Network (PSTN), or over an Internet Protocol (IP) network. It may also include communication via pager, "walkie talkie", network based instant connect communication, also known as Push to Talk™, or any other type of communication session that can be initiated from a wireless device. For convenience, in describing the embodiments of the invention, the term "communication session" may be used interchangeably with the term "call".

Although the memory capacity in some of the more advanced wireless communication devices is sufficient to enable the storage of entire personal directories, some of these advanced devices also provide menu options that can increase the difficulty of learning how to utilize the storage capabilities of the device, including the contact directory storage capabilities. Additionally, as the contact list on a wireless communication device grows, it becomes more difficult and time consuming to find a particular contact. For at least these reasons, some users prefer to rely on their own personal memory or secondary telephone directories that have already been created, rather than having to learn how to download or synchronize the contact entries onto their personal communication devices.

In some cases, it may be difficult or inconvenient for a user to download or synchronize the contact directories that exist within the software applications running on their personal computers. For example, email applications, gaming applications, instant messaging applications, calendar applications, telephony applications, and many other applications provide contact directories that can be presented to a user through a graphical user interface for user interaction. These interfaces, however, are not always compatible with the directory formats provided by many wireless communication devices, thereby increasing the difficulty in extracting the desired contact information and storing it in a format supported by the device, thereby forcing the user to look up contact information on the personal computer, and then input the information into the wireless device either to store it for later use or to initiate a communication session.

To avoid some of the foregoing limitations, some people have begun to make wireline telephone calls directly from their personal computers. For example, some of the telephone directories that are configured to reside on computing devices include links to corresponding telephony and modem applications that enable a user to place a wireline telephone call directly from their personal computer to one or more recipient communication devices and in direct response to a selection of a recipient's name, telephone number, or other contact information from the contact directory.

Initiating a telephone call from a personal computer in this manner can be useful because of the convenience and familiarity in finding the contact information that is necessary to initiate the call. It can also be useful to initiate a call from a personal computer when the caller intends to utilize the computer during the call to access other information that may be a subject of conversation during the call, because the caller may have to maintain a presence at the computer. Furthermore, telephone numbers and other contact information are often contained within the text of an email, a web page, or another document on the personal computer, making it more convenient to initiate a communication session from the personal computer, rather than having to input the telephone number or other contact information into a separate device to initiate the session.

One problem with initiating a call in the foregoing manner, however, is that the caller's personal computer may not have adequate telephony capabilities to provide the quality that is desired during the call. Likewise, the caller may wish to communicate with the recipient via a wireless communication device, so that the user can have the flexibility to move around, away from the computer, at various times during the call for any particular reason. It may also be preferable for the caller to place the call with a wireless communication device because of favorable billing options and rates that may not be available through the computing device.

In summary, even though the contact directories of a personal computer can sometimes provide a convenient way to place a wireline telephone call with an intended recipient, callers may not wish to initiate a call through the computer because they do not want to engage in the actual telephone conversation though their computer's telephony applications for any number of reasons, including cost, convenience, quality, preference, and so forth.

SUMMARY OF THE INVENTION

The present invention is directed to the initiation of communication sessions, such as telephone calls and instant connect communication sessions (also known as Push to Talk™ sessions) between the wireless communication device of a caller and one or more recipient communication devices in response to caller input received at a separate computing device, such as a personal computer, without requiring the caller to communicate through the telephony applications of the computing device.

According to one embodiment, the caller provides input at a computing device that identifies a wireless communication device of the caller and one or more recipient communication devices that are to be utilized during a call. Identification of the caller's wireless communication device and the recipient communication devices can occur through the use of specialized user interfaces or existing application interfaces that are configured or modified to present contact information, including information about the caller's wireless communication device and the recipient communication devices, to the caller at the computing device.

Once the caller has identified the intended parties of the call, and sometimes the modality of the call as described herein, the computing device transmits calling instructions to the caller's wireless communication device that enable or cause the wireless communication device to call the one or more recipient communication devices. In this manner, the caller can utilize the contacts directory and other contact resources available on his computer to initiate the call, while using the functionality and resources available on the caller's wireless communication device to engage in and complete the call, without requiring the caller to communicate through the telephony applications of the computing device.

In certain embodiments, the calling instructions are provided to the caller's wireless communication device through a remote server, such as a call initiation server, which is configured to further process and transmit the calling instructions to the caller's wireless communication device. In other embodiments, the call initiation server communicates with a conference server, which are well known in the art, and that is configured to initiate the call by making outbound calls to the caller's wireless communication device and the recipient communication devices and then bridging the calls together. This can be particularly useful when the intended call is a conference call that includes a large number of recipients. In such embodiments, the conference server can make the calls simultaneously or sequentially. In other embodiments, the call initiation server can initiate the call by providing instructions to the caller's wireless communication device that cause the device to place the call to the one or more recipient communication devices.

These methods enhance the usefulness of wireless communication devices and of contacts directories stored on personal computers. Additionally, they make use of other contact information, such as telephone numbers and URIs contained within emails, web pages, and other documents residing on personal computers. In contrast to structured contacts lists or directories, contact information that is contained in such documents is in a "free form" and, despite not being in a formatted contacts list or directory, is nonetheless recognizable as contact information and can be used according to the invention to initiate calls. Wireless callers can now place wireless calls by interacting with contact information located on personal computers. In addition, the methods of the invention push call traffic to wireless networks, which is beneficial for wireless service providers and for users who prefer to engage in wireless calls.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention can be obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

According to various embodiments of the present invention, a communication session is initiated between a wireless communication device and one or more recipient communication devices in response to caller input that is entered at a computing device that is independent of the wireless communication device and recipient communication devices.

Caller input received at the computing device can be used to help identify the intended parties of a call, namely, the wireless communication device used by the caller and one or more recipient communication devices that are to be connected to participate in the call. Based on input by the user, the computing device then generates and transmits calling instructions that are to be used to initiate the call between the identified wireless communication device and the recipient communication devices.

As previously noted, the term "communication session" as used herein, is generally defined as a communication session between two or more communication devices, and for convenience is sometimes referred to herein as a "call" The "call" can include any number of modalities, such as a half duplex communication, which is often referred to as "push-to-talk" communication, and which is hereinafter referred to as "network-based instant connect" communication, a full duplex wireless call over a packet data network or a circuit switched network, a wireline call over the public switched telephone network (PSTN) or other types of network based communication. The communication can include text, audio, images, video, script, and programming data that is transmitted through digital and/or analog signals. Although the term "call" is sometimes used in reference to a telephone call, the term "telephone" should not be construed as limiting the interpretation and scope of the invention with regard to the term "call".

The terms "wireless communication device" and "recipient communication device" generally refer to the intended parties of a call. More specifically the wireless communication device and recipient communication device refer to the telephones or other communication devices that are connected and engage in communication during the call. In general, the wireless communication device and the recipient communication devices are separate and distinct from the computing device that is used to receive user input identifying the intended parties of the call and to generate the calling instructions for initiating the call.

A wireless communication device is used by the calling party in conjunction with the methods of the invention. However, the recipient communication devices can include any combination of wired or wireless telephone devices, including landline telephones, pagers, radios, computing devices with telephony capabilities such as PDAs and "smart phones", and other similar communication devices that are capable of communicating with other communication devices over a network, such as a cellular network, a packet data network, an 802.11 network, or the public switched telephone network (PSTN).

The term "calling instructions" broadly refers to any data or information that can be used by a server or communication device to place a call to another communication device. The calling instructions can include, for example, a telephone number, a session initiation protocol (SIP) uniform resource identifier (URI), or other URI, a pager number, caller identification information, a time to place a call, modality of the call, one or more services to use or apply during the call and any other instructions that can be used to control, enhance or modify the call.

Figure 1:
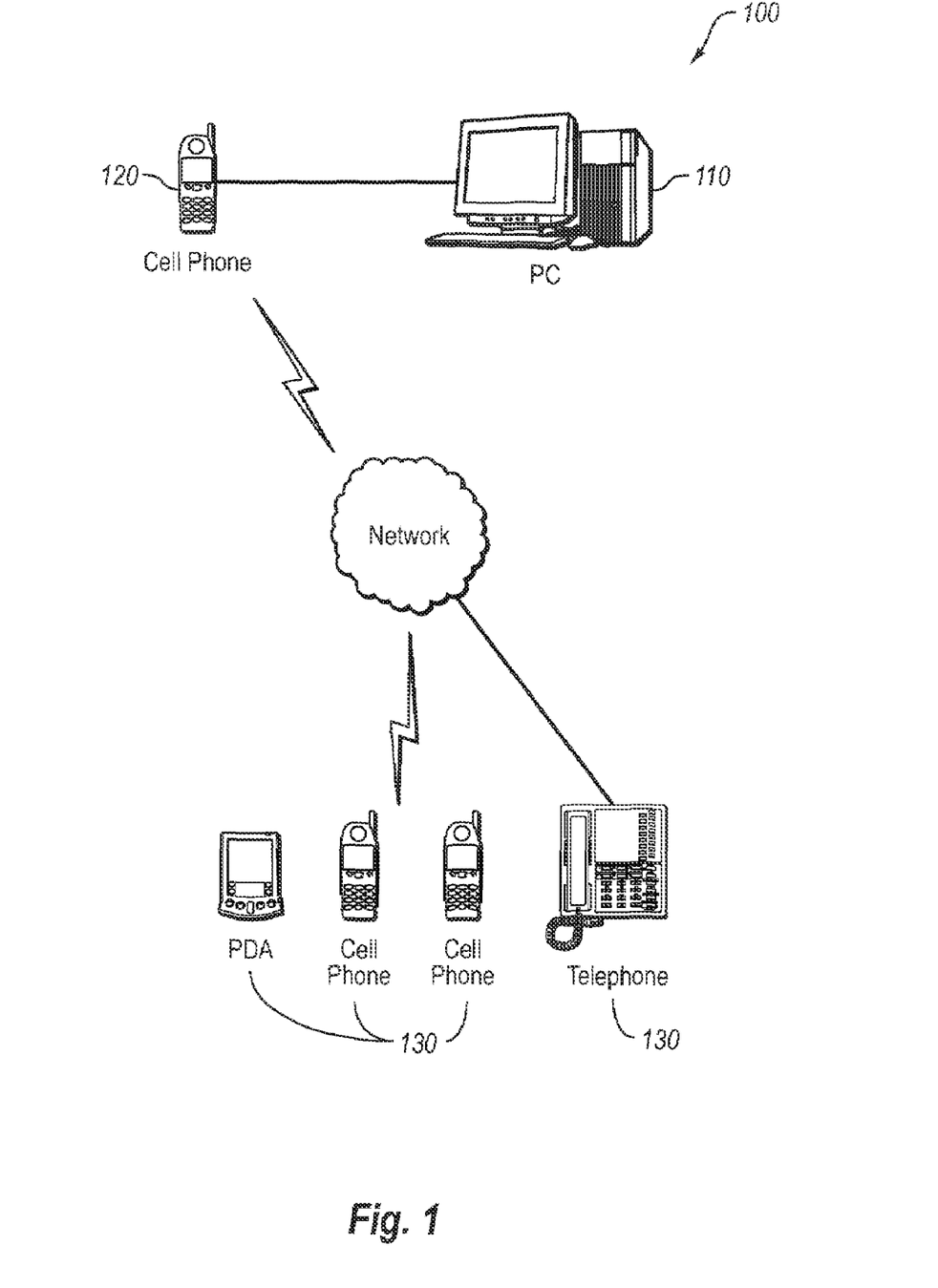
FIG. 1 illustrates one embodiment of a network that includes a computing device and a plurality of communication devices.

FIG. 1 illustrates one example of a network 100 in which certain embodiments of the invention can be practiced. As shown, the illustrated network 100 includes a computing device 110, a wireless communication device 120, and a plurality of recipient communication devices 130. Wireless communication device 120 and recipient communication devices 130 may communicate with each other through a network 150, such as a cellular network, an IP network, an 802.11 network or the PSTN.

Figure 2:
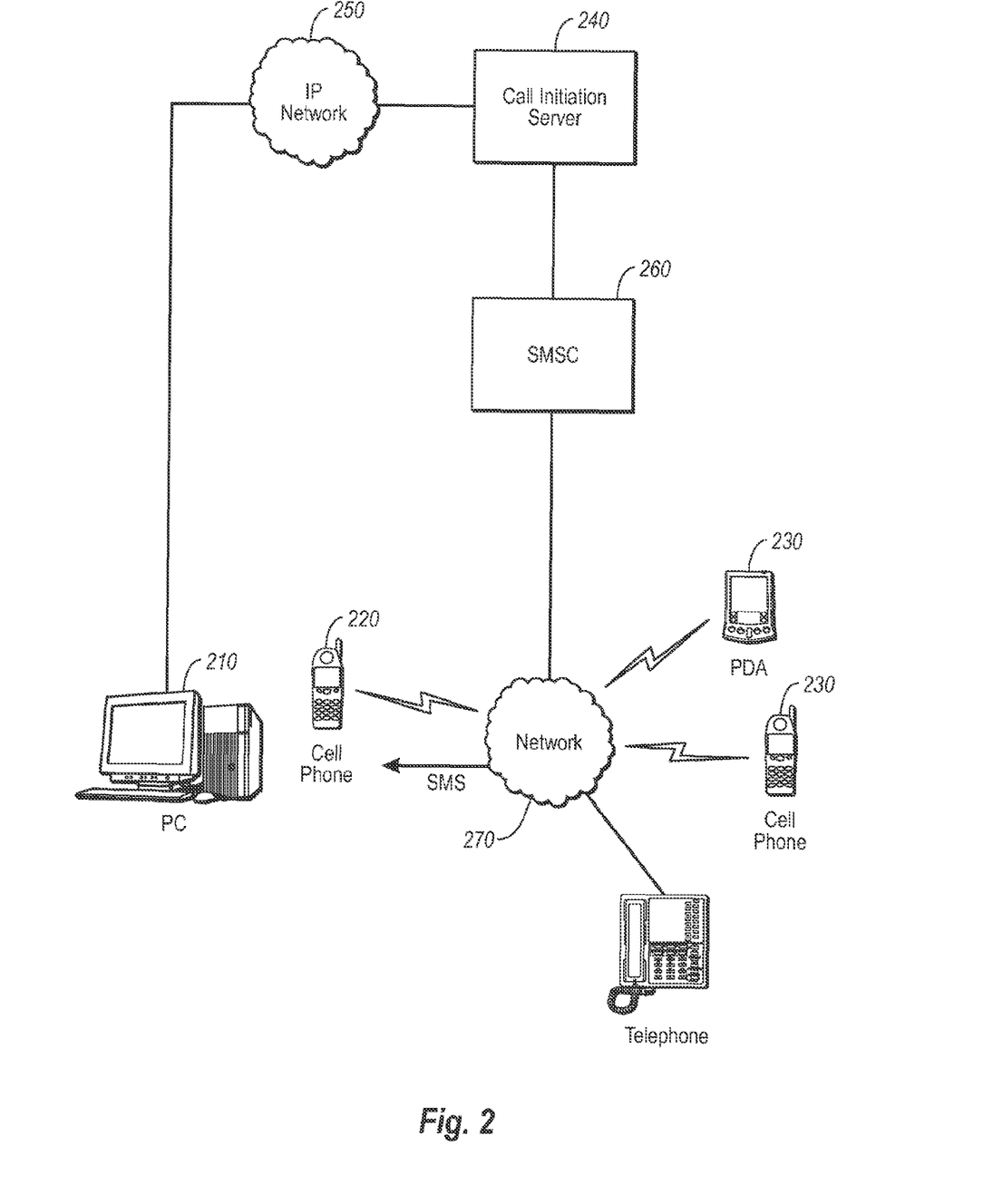
FIG. 2 illustrates one embodiment of a network that includes a computing device, a call initiation server, a short message service central (SMSC) and a plurality of communication devices.

FIG. 2 illustrates one example of a network in which certain embodiments of the invention can be practiced. As shown, the illustrated network includes a computing device 210, a wireless communication device 220, a plurality of recipient communication devices 230, a Short Message Service Central (SMSC) 260, a call initiation server 240 that is connected with the computing device 210 through network 250, and a network 270 through which wireless communication devices 220 and recipient communication devices 230 communicate.

Figure 3:
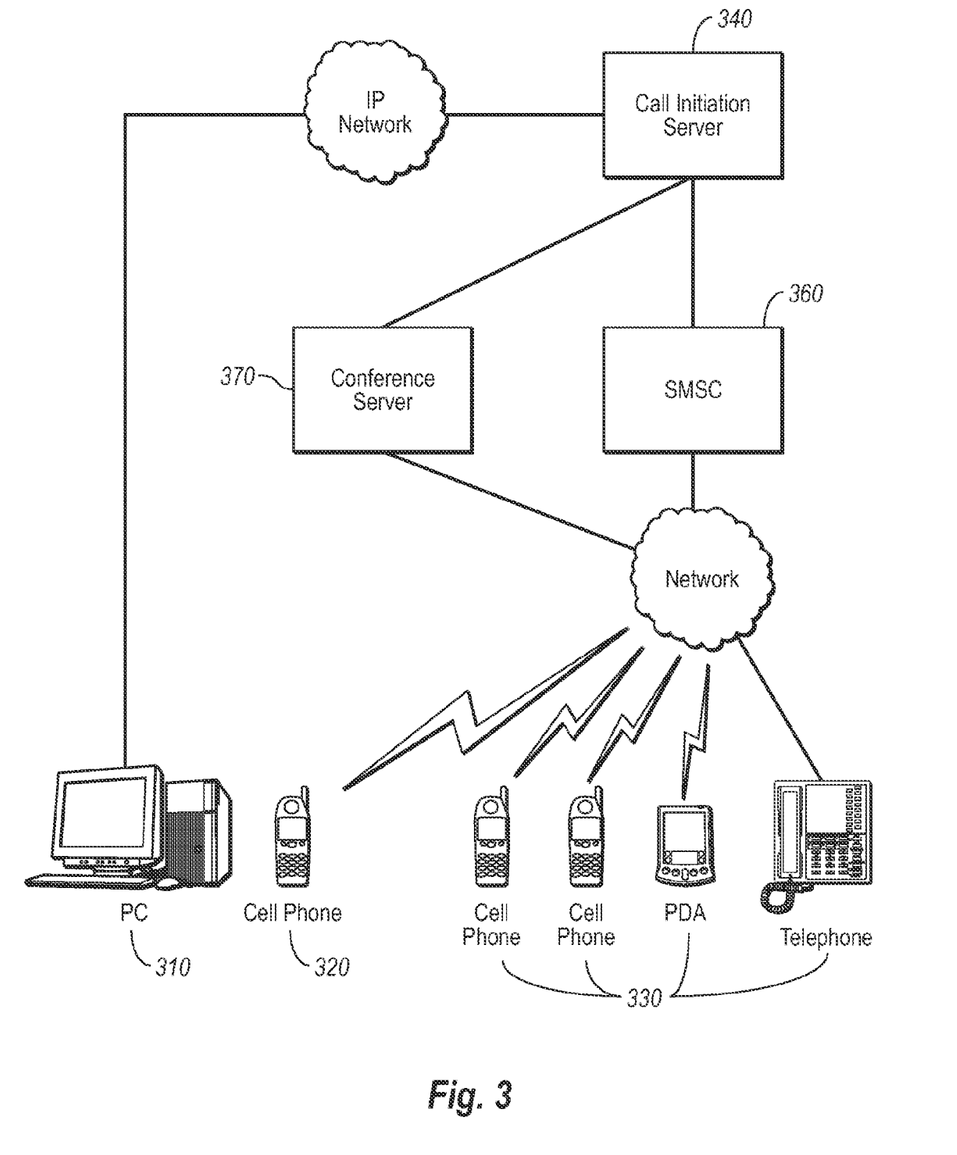
FIG. 3 illustrates one embodiment of a network that includes a computing device, a call initiation server, an SMSC, a conference server, and a plurality of communication devices.

FIG. 3 illustrates one example of a network 300 in which certain embodiments of the invention can be practiced. As shown, the illustrated network 300 includes a computing device 310, which is connected to a call initiation server 340 through IP network 350, a wireless communication device 320, an SMSC 360, a conference server 370, and a plurality of recipient communication devices 330. Each of the illustrated network components will now be described in more detail.

It should be understood that the arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

Initially, the computing devices 110, 210, and 310 of FIGS. 1, 2, and 3 respectively comprise a special purpose or general-purpose computer that includes various computer hardware and software. Embodiments of the computing device can include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM, DVD-ROM or other optical disk storage, magnetic disk storage or other magnetic storage devices, or any other medium which can be used to carry or store desired program code means in the form of computer-executable instructions or data structures, referred to herein as modules, and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 4:
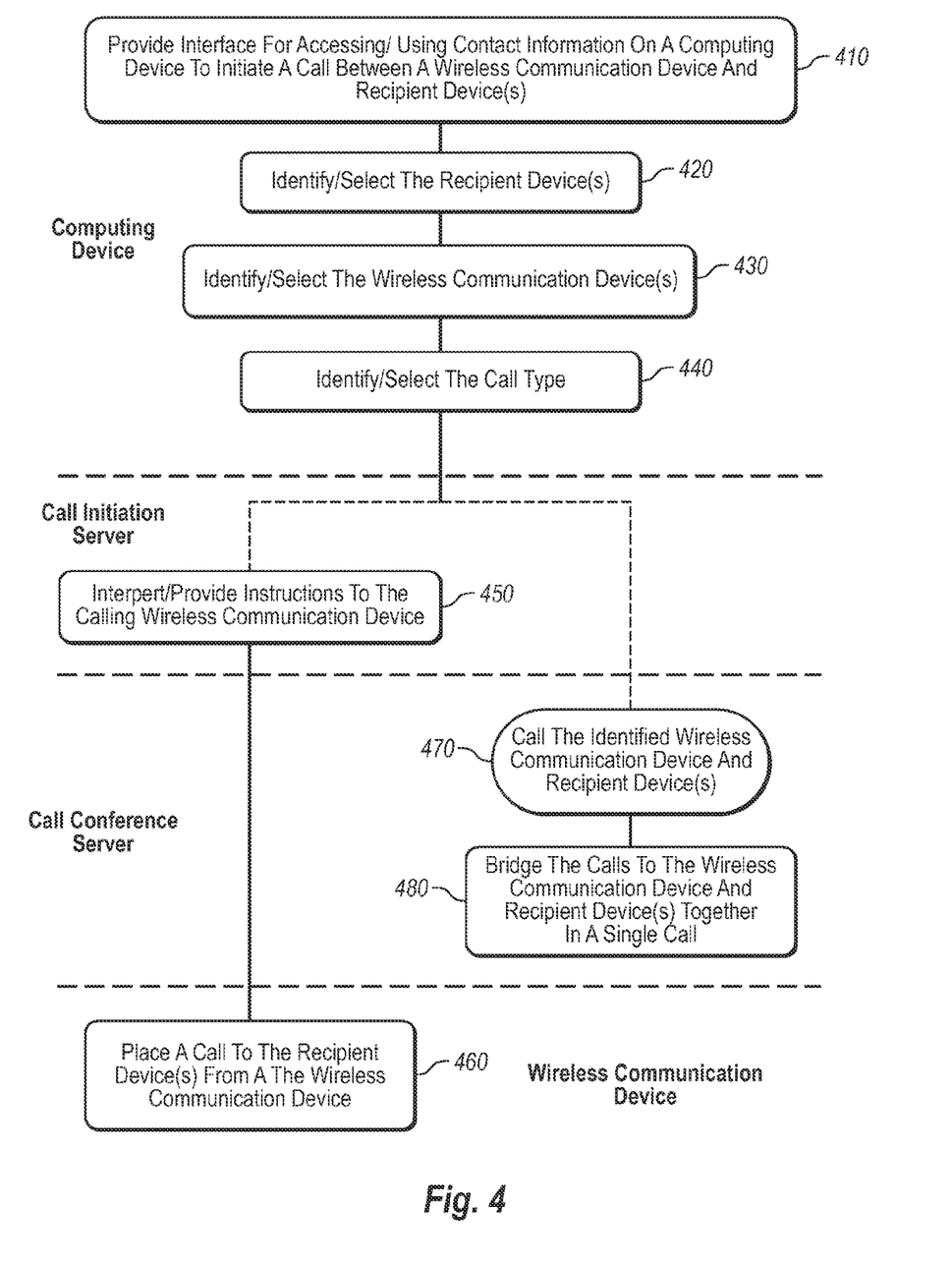
FIG. 4 is a flow diagram illustrating methods for initiating a call between a wireless communication device and one or more recipient communication devices.

The computing device is capable of executing modules (e.g., computer-executable instructions) that enable it to execute the acts 410, 420, 430 and 440, described below. For example, the computer-executable instructions enable the computing device to provide access to contact information for user selection, to receive user input, and to generate calling instructions in response to the user input, thereby facilitating the initiation of a call in response to input received at the computing device, and between various other communication devices, as described herein.

With regard to receiving user input, computing devices 110, 210 and 310 can be configured to receive user input through various input sources, such as keyboards, mouses, touch pads, microphones and corresponding speech recognition software, and through any other suitable input means, including but not limited to wireless input devices.

Although computing devices 110, 210 and 310 are shown to have the form factor of desktop computers, and are often referred to herein as personal computers, it will be appreciated that the physical configuration of the computing devices is not a limiting factor of the invention. For example, in other embodiments, computing devices 110, 210 and 310 can include a portable laptop computer, a PDA, a kiosk, one or more networked computers, and combinations thereof. The computing devices can also include telephone devices and specialized computers that are independent or that are at least operably detachable from the wireless communication devices 120, 220 and 320. In one embodiment, the computing device is also separate and remote from the call initiation server and the conference server.

In one embodiment of the invention depicted in FIG. 1, computing device 110 transmits calling instructions directly to the wireless communication device 120, using a wireless network connection such as Bluetooth or 802.11, or a wireline connection such as an Ethernet or RS-232 cable connected to a PC either directly or using a cradle. In this embodiment, the wireless communication device 120 may use call initiation client software that can receive and interpret a data packet generated and transmitted from the call initiation software resident on computing device 110. The call initiation client software can then execute the calling instructions contained in the data packet. The call initiation client software on wireless communication device 120 responds to calling instructions received from computing device 110 by automatically initiating an outbound call to the one or more recipient communication devices, which may include any combination of wireless and wireline devices reachable over a network. This initiation of the outbound call is performed automatically in the sense that in response to instructions from computing device 110, the wireless communication device 120 enters or otherwise selects one or more recipient telephone numbers. The outbound call may be initiated by the wireless communication device 120 without requiring any user input at the wireless communication device or by only requiring the user to press a single button on the wireless communication device to initiate the call.

In one embodiment of the invention depicted in FIG. 2, computing device 210 generates calling instructions in response to user input and transmits the calling instructions over an IP network 250 to call initiation server 240. The calling instructions include instructions for initiating a call between selected devices. The call initiation server 240 includes sufficient hardware and software modules for processing calling instructions and, for modifying the calling instructions into a suitable format for receipt and interpretation by the wireless communication device 220.

Call initiation server 240 also includes sufficient hardware and software modules for communicating with various servers on the network, such as the SMSC 260 and for routing calling instructions to other servers in the network, such as conference server 370 when required.

In the embodiment depicted in FIG. 2, call initiation server 240 communicates with an SMSC 260 to initiate generation and transmission of a Short Message Service (SMS) message that is sent from the SMSC to the wireless communication device 220. The SMS message includes calling instructions that cause the wireless communication device 220 to dial one or more recipient communication devices. However, other communication protocols, such as the Session Initiation Protocol (SIP) may be used to notify wireless communication device 220 of calling instructions. In the case where multiple recipient communication devices are selected to participate in a call, the wireless communication device 220 may utilize the inherent conference features of the device to set up a conference call between the devices.

FIG. 3 illustrates another embodiment of a network 300 in which certain methods of the invention can be practiced. In particular, the illustrated network 300 includes a computing device 310, a wireless communication device 320, a plurality of recipient communication devices 330, a call initiation server 340, an SMSC 360, and a conference server 370.

In this embodiment, computing device 310 generates and transmits calling instructions to call initiation server 340 in response to user input at computing device 310. Upon receipt of the calling instructions, call initiation server 340 determines the nature of the requested communication, including the identities of the communication devices to be included in the call, the type of call to be placed, the modality of the call, and any other instructions that may enhance or otherwise control the call. For example, in response to the calling instructions, call initiation server 340 may communicate with conference server 370, which includes computing modules that enable the conference server 370 to place calls to both the wireless communication device 320 as well as to the one or more recipient communication devices 330 and to bridge the calls it places into a single conference call, as described in more detail below. Alternatively, call initiation server 340 may communicate with SMSC 360 to cause an SMS message, which contains call back instructions, to be generated and transmitted to all of the selected communication devices. The call back instructions prompt the communication devices 320 and 330 to dial into conference server 370, whereupon the parties are connected for participation in the call. In this way the devices do not require any specialized client software to interpret the call back instructions; they need only support the ability to receive an SMS message. However, should wireless communication device 320 be equipped with call initiation client software, wireless communication device 320 could be enabled to automatically respond to the call back instructions contained in the SMS message by dialing into the specified conference server without requiring user intervention.

As noted above, one benefit of the use of a conference server 370 is that the conference server itself initiates the telephone calls. Thus, wireless communication device 320 does not need to have any client software that is adapted for receiving and executing calling instructions as has been described above in reference to the embodiment of FIG. 1, which requires wireless communication device 120 to be equipped with call initiation client software in order to receive and process calling instructions from computing device 110. As a result, the embodiment of FIG. 3 is capable of being used with substantially any type of existing wireless communication device 320 without modification of the wireless communication device. Alternatively, wireless communication device 320 may be equipped with call initiation client software, in which case the functionality of the device in accordance with the invention may be enhanced. Yet another advantage of using a conference server is that additional recipient communication devices can be added to the call at any time while the call is in progress.

In some embodiments, the call initiation servers 240 and 340 include authentication and validation modules that are capable of authenticating and validating computing device 210 and 310 so that the requests and corresponding calling instructions received from the computing device can be processed with a high degree of assurance that they were received from an authorized source.

The wireless communication devices and the recipient communication devices are each shown to have the form factor of a wireless telephone. The invention, however, is not limited to embodiments in which wireless communication devices and recipient communication devices comprise wireless telephones. Rather, as mentioned above, the wireless communication devices 120, 220 and 320 and the recipient communication devices 130, 230, and 330 can include any combination of communication device that is separate from computing devices 110, 210 and 310, such as wireless telephones, wireline telephones, pagers, communication enabled PDAs, radio communication devices, and so forth.

Now, turning to FIG. 4, certain methods of the invention will be described in reference to flowchart 400. In particular, the illustrated flowchart 400 includes various acts that can be performed by many of the aforementioned network components, including the computing device, the call initiation server, the SMSC, the conference server, the wireless communication device, and the recipient communication devices.

Initially, the first four illustrated acts (act 410, 420, 430, 440) of the method are shown as being performed at the computing device. However, this should not be construed as limiting the scope of the invention. In particular, as described below, some of the acts shown in flowchart 400 can be performed by the call initiation server. Furthermore, certain methods of the invention include more acts than are illustrated or can be performed without executing each of the identified acts. Finally, the order in which the acts are illustrated is not a limitation on the invention. Rather, the acts can be performed in any appropriate sequence. For example, in certain embodiments, act 430 may be performed prior to act 420. Likewise, act 450 may be performed prior to act 440. In some embodiments, the acts may be performed simultaneously rather than in distinct steps as illustrated in FIG. 4.

In one embodiment, corresponding with the illustrated flowchart 400, the computing device provides call initiation software along with an interface for using its contact information to facilitate a call between a wireless communication device and one or more recipient communication devices (act 410). This act can be executed whenever the computing device provides an interface, such as a Graphical User Interface (GUI) or a voice activated interface for the user to access contact information that can be used to help identify the intended parties of a call. The interface can be an independent specialized interface corresponding to a discrete contact directory or, alternatively, an interface can be an integrated interface that is provided by an existing application, such as an email, calendar, messaging, or telephony application, and so forth. Alternatively, a generalized interface, such as a right-click context menu may be used that allows call initiation to any communication address, including a telephone number, SIP URI or other URI.

According to one exemplary embodiment, the interface allows a user to select from a list of one or more potential recipients and to select one or more corresponding recipient communication devices (act 420) that are to be called. For example, the interface may provide a list of people to contact along with various contact numbers (e.g., telephone number, fax number, pager number, etc.) that can be used when connecting with their various communication devices. The user can then select or provide this information at the computing device. The selection of the contact information can be made in any suitable manner, such as by double clicking on a displayed object, or by right-clicking on the object and then selecting an action from a right-click context menu.

In another example, the selection of the recipient party and intended recipient communication devices can be made by dragging and dropping contact information or icons corresponding to the intended recipients onto other objects or icons that are associated with the software applications of the invention and that are configured to generate and send calling instructions to the wireless communication device or the call initiation server. In such embodiments, the interface or objects receiving the user input can be configured to extract the necessary contact information that is required to place the call. For example, if a contact object from a contact list in an email application is selected in such a manner as to indicate that the user intends to call the corresponding contact, the appropriate telephone number or other contact number that is included within the email contact object can be extracted and used to generate appropriate calling instructions for calling the contact. In some situations, however, the extraction cannot be performed automatically, but will instead require the user to manually supply the number of the contact to be called. Likewise, in some circumstances, the contact may be associated with multiple contact numbers and devices, which requires the user to indicate which of the contact numbers or devices to use. In another implementation, the user can right-click or otherwise select contact information, such as a telephone number, from the text in a document or an email, and through a specialized user interface cause initiation of a call to that telephone number.

Although the foregoing example may require a new or specialized interface, existing application directories can be modified through application programming interfaces (APIs) or other programming modules to identify and intercept the selection of a contact entry made at the existing application directories and interfaces, without requiring the user to open or interact with an entirely new application. In particular, the existing applications can be configured to present a user interface for call initiation and interact with a separate call initiation application to automatically route contact information through a modem or router to the appropriate servers or wireless communication devices, which generate the appropriate calling instructions, without requiring the user to open or utilize a separate application at the computing device.

The next illustrated act in the method of FIG. 4 is to identify or select a wireless communication device that is to be used for calling the one or more recipient communication devices (act 430). The selection of the wireless communication device can be performed manually, through the use of the interface described above or through a separate interface, by prompting a caller for user input at the computing device that identifies or selects the wireless communication device to use for making the call. In another embodiment, the selection of the wireless communication device occurs automatically or selects a default device, based on user input that was previously provided, such as during installation of corresponding computer modules or based on information that is already stored on the computing device. Alternatively, the selection of the communication device can be established and performed at the call initiation server 240 and 340 based on preferences previously specified by the user and on device information that is accessed or known by the servers about the device, such as the telephone number of the wireless communication device. The call initiation client and/or server software may further be enabled to take into account various calling plans to which the caller subscribes as a criterion for communication device selection.

The final illustrated act of identifying or selecting a call type and modality (act 440) can also be performed by the call initiation server 240 and 340, although it is illustrated in FIG. 4 as being performed only by the computing device. The act 440 of identifying the call type and modality can involve several stages. Initially, identifying the call type may be as simple as determining whether the call is a two-party call or a conference call. The identification of the call type can also involve the identification of the type of media (e.g., text or multimedia messages, audio communication, file transfer, video, and so forth) that are to be transmitted during the call. The identification of the call type can be automatically determined based on default settings, known capabilities of the communication devices, and other constraints or an interface can be employed at the computing device to prompt the user for input that can help to select the call type. An example of the act of identifying the modality of the call may include selecting a half duplex modality such as a network-based instant connect communication session, or the selection of a traditional full duplex telephone call.

In one embodiment, the various calling information that is identified at the computing device or call initiation server is referred to generically as "calling instructions," although calling instructions are not necessarily limited to the calling information identified at the computing device. Accordingly, in other embodiments, the calling instructions also include various other data or scripts that can be generated at network elements other than computing device 110, 210, and 310 and that can be used to control or otherwise modify how the call is placed.

In particular, upon identifying all of the necessary information to establish a call, additional calling instructions that can affect or control the call can be generated at the computing device or the call initiation server to affect how the call occurs between the client communication device and the one or more recipient communication devices. For example, the calling instructions can be modified by the call initiation server to include a script that causes the wireless communication device to place the call with the intended recipients, at a particular time, in a particular way. Similarly, the call initiation server may modify the calling instructions for receipt and processing by another server in the network, such as an SMSC or a conference server. For example, the call initiation server can instruct the SMSC server to generate and send SMS messages to the wireless communication device and other recipient communication devices that cause the devices to place the desired calls.

In certain embodiments, the calling instructions are not modified but are instead merely transmitted from the computing device to the wireless communication device. For example, in such embodiments, the call initiation server can transfer the calling instructions to the wireless communication device upon receiving them from the computing device (act 350) and without modifying them. The act of providing calling instructions to the wireless communication device (act 350) can be performed automatically and indiscriminately or, alternatively, on a discriminate basis and only upon satisfying certain criteria, such as only upon authenticating and validating the computing device as an authorized device to initiate the call. In yet other embodiments, such as the one illustrated in FIG. 1, the calling instructions can be transmitted directly from the computing device to the wireless communication device, through an appropriate network connection, thereby bypassing the call initiation server altogether.

Upon receiving the calling instructions, the wireless communication device places a call to the one or more recipient communication devices that are identified by the calling instructions and in the manner so specified. For example, if the calling instructions specify that a network based instant connect call should be placed to the wireless telephone of recipient A at a particular time, then the caller's wireless communication device calls the wireless telephone of recipient A at the device identification number specified at the appropriate time and using the specified modality. If there are multiple recipients that are to be called simultaneously, such as to enable a conference call, then the wireless communication device calls each of the intended recipients in the manner necessary to complete the conference call.

In another embodiment, the wireless communication device and the one or more intended recipient communication devices receive a message, such as an SMS or SIP message, that include calling instructions that cause each of the devices to individually call a conference server that subsequently bridges the individual calls together into a single conference call, as generally described above.

In yet another embodiment, the call initiation server can instruct the conference server to connect the conference call by calling each of the identified calling parties (e.g., caller's wireless communication device and recipient communication devices) on separate calls and then bridging the calls together (acts 470 and 480). The calls can either be placed simultaneously or sequentially and in any desired order. For example, in one embodiment, the caller's wireless communication device is the first device that is called, then and only then are the other intended recipient communication devices called. In one embodiment, the ability to place such a conference call is enabled by the modules stored at the conference server. In other embodiments, however, the placing of a conference call can also be performed through the modules and functionality provided by the wireless communication device. For example, as mentioned above, the call initiation server may simply transmit the calling instructions to the wireless communication device, which then uses standard calling features to establish a conference call with the intended recipient communication devices.

The foregoing methods, as generally described, enable a caller to initiate a call at a computing device that is completed through a wireless communication device that is separate and independent of the computing device used to initiate the call. One advantage this provides over prior art techniques for placing calls is that the caller can utilize the functionality and utility of the computing device and corresponding applications to access contact information of the intended recipients and to quickly initiate a communication session, while enabling the caller to utilize the functionality, quality and utility of a wireless communication device to engage in and complete the call, without requiring the caller to utilize the telephony capabilities of the computing device. Another advantage provided by the present invention is that callers do not need to download each of their contact entries into their wireless device contact directories or to navigate through their wireless device contact directories in order to place the call. Instead, the call can be quickly and efficiently placed at the computing device using existing contact information.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computing device that has access to contact information identifying recipient communication devices, a method for initiating a call between a wireless communication device and one or more of the recipient communication devices, the method comprising:
   displaying the contact information at the computing device;
   receiving user input, at the computing device, that identifies the contact information of the one or more recipient communication devices to be connected in the call with the wireless communication device;
   in response to the user input, generating calling instructions that are used to initiate the call between the wireless communication device that is separate from the computing device and the one or more recipient communication devices; and
   transmitting the calling instructions to the wireless communication device, wherein the calling instructions cause the wireless communication device to call the one or more recipient communication devices upon receiving the calling instructions.

2. A method as recited in claim 1, wherein the wireless communication device is a first mobile telephone; wherein the one or more recipient communication devices include a second mobile telephone having a telephone number; and wherein the calling instructions cause the first mobile telephone to automatically call the telephone number of the second mobile telephone in response to receiving the calling instructions.

3. A method as recited in claim 1, wherein the wireless communication device is a first mobile telephone; wherein the one or more recipient communication devices include a landline telephone having a telephone number; and wherein the calling instructions cause the first mobile telephone to automatically call the telephone number of the landline telephone in response to receiving the calling instructions.

4. A method as recited in claim 1, wherein the wireless communication device is a first mobile telephone; wherein the one or more recipient communication devices include a second telephone having a telephone number; and wherein the calling instructions cause the first mobile telephone to automatically call the telephone number of the second telephone in response to receiving the calling instructions.

5. A method as recited in claim 1, wherein the user input identifies both the wireless communication device and the one or more recipient communication devices.

6. A method as recited in claim 1, wherein the calling instructions, which cause the wireless communication device to call the one or more recipient communication devices upon receiving the calling instructions, are transmitted in an SMS message or a SIP message.

7. A method as recited in claim 1, wherein the call comprises a push-to-talk communication; and wherein the calling instructions cause the wireless communication device to initiate the push-to-talk communication with the one or more recipient communication devices upon receiving the calling instructions.

8. A method as recited in claim 1, wherein the user input includes a dragging and dropping of an object that defines contact information on a graphical user interface of the computing device.

9. A method as recited in claim 1, wherein the user input includes a selection from a list displayed on a graphical user interface of the computing device.

10. A method as recited in claim 1, wherein the user input includes a selection from a contacts list available to the computing device.

11. A method as recited in claim 1, wherein the contact information is contained in a contacts list stored in the computing device or in a free form in a document stored in the computing device.

12. A method as recited in claim 1, wherein the user input includes selecting contact information in a web page or clicking a hyperlink in a web page.

13. A method as recited in claim 1, wherein the contact information includes at least one telephone number.

14. In a computing device that has access to contact information identifying recipient communication devices, a computer-readable storage device for implementing a method for initiating a call between a wireless communication device and one or more recipient communication devices, the computer-readable storage device having stored thereon:
computer-executable instructions that, when executed, cause the computing device to implement the method, including:
displaying the contact information at the computing device;
receiving user input, at the computing device, that identifies the contact information of one or more recipient communication devices to be connected in the call with the wireless communication device;
in response to the user input, generating calling instructions that are used to initiate the call between the wireless communication device that is separate from the computing device and the one or more recipient communication devices; and
transmitting the calling instructions to a server;
wherein the server transmits the calling instructions to the wireless communication device, such that the wireless communication device calls the one or more recipient communication devices upon receiving the calling instructions.

15. A computer-readable storage device as recited in claim 14, wherein the wireless communication device is a first mobile telephone; wherein the one or more recipient communication devices include a second mobile telephone having a telephone number; and wherein the calling instructions cause the first mobile telephone to automatically call the telephone number of the second mobile telephone in response to receiving the calling instructions.

16. A computer-readable storage device as recited in claim 14, wherein the user input specifies a type of the call.

17. A computer-readable storage device as recited in claim 14, wherein the wireless communication device is a first mobile telephone; wherein the one or more recipient communication devices include a landline telephone having a telephone number; and wherein the calling instructions cause the first mobile telephone to automatically call the telephone number of the landline telephone in response to receiving the calling instructions.

18. A computer-readable storage device as recited in claim 14, wherein the wireless communication device is a first mobile telephone; wherein the one or more recipient communication devices include a second telephone having a telephone number; and wherein the calling instructions cause the first mobile telephone to automatically call the telephone number of the second telephone in response to receiving the calling instructions.

19. A method as recited in claim 14, wherein the server, before transmitting the calling instructions to the wireless communication device, verifies that the computing device is authorized to generate the calling instructions for the wireless communication device.

20. In a computing device that has access to contact information identifying recipient communication devices, a method for initiating a call between a wireless communication device and one or more of the recipient communication devices, the method comprising:
receiving user input, at the computing device, that identifies contact information of the one or more recipient communication devices that are to be connected in the call with the wireless communication device;
generating calling instructions to be used to initiate the call between the one or more recipient communication devices and the wireless communication device; and
providing the calling instructions from the computing device, through a call initiation server, to the wireless communication device, wherein the wireless communication device calls the one or more recipient communication devices using the calling instructions;
wherein the wireless communication device calls the one or more recipient communication devices upon receiving the calling instructions;
wherein the calling instructions cause the wireless communication device to call the one or more recipient communication devices automatically.

21. A method as recited in claim 20, wherein the computing device receives user input that identifies the wireless communication device; and wherein the calling instructions, which cause the wireless communication device to call the one or more recipient communication devices automatically, are transmitted using an SMS message or a SIP message.

22. A method as recited in claim 20, wherein the wireless communication device is a first mobile telephone; wherein the one or more recipient communication devices include a second mobile telephone having a telephone number; and wherein the calling instructions cause the first mobile telephone to automatically call the telephone number of the second mobile telephone in response to receiving the calling instructions.

23. A method as recited in claim 20, wherein the wireless communication device is a first mobile telephone; wherein the one or more recipient communication devices include a landline telephone having a telephone number; and wherein the calling instructions cause the first mobile telephone to automatically call the telephone number of the landline telephone in response to receiving the calling instructions.

24. A method as recited in claim 20, wherein the wireless communication device is a first mobile telephone; wherein the one or more recipient communication devices include a second telephone having a telephone number; and wherein the calling instructions cause the first mobile telephone to automatically call the telephone number of the second telephone in response to receiving the calling instructions.

25. A method as recited in claim 20, wherein the call initiation server, before transmitting the calling instructions to the wireless communication device, verifies that the computing device is authorized to generate the calling instructions for the wireless communication device.

26. In a server that communicates with a computing device and with a wireless communication device, a method for initiating a call between the wireless communication device and one or more recipient communication devices, the method comprising:

receiving, at the server, calling instructions from the computing device corresponding to the call that is to be initiated between the wireless communication device that is separate from the computing device and the one or more recipient communication devices, wherein the calling instructions have been generated at the computing device in response to user input at the computing device; and the server, upon receiving the calling instructions, initiating the call between the wireless communication device and the one or more recipient communication devices using the calling instructions to connect the wireless communication device and the one or more recipient communication devices in the call;

wherein the server causes the call to be initiated by a first SMS message sent to the wireless communication device and a second SMS message sent to each of the one or more recipient communication devices, the first and second SMS messages containing calling instructions that cause the wireless communications device and the one or more recipient communication devices to call a conference server that joins the wireless communications device and the one or more recipient communication devices in a conference call.

27. A method as recited in claim 26, wherein initiating the call comprises the server transmitting the calling instructions to the wireless communication device, which uses the calling instructions to call the one or more recipient communication devices.

28. A method as recited in claim 26, wherein the server is remotely located from the wireless communication device and the computing device.

29. A method as recited in claim 26, wherein the user input identifies the wireless communication device and the one or more recipient communication devices.

30. A method as recited in claim 26, wherein the server, before initiating the call, verifies that the computing device is authorized to generate the calling instructions for the wireless communication device.

31. In a server that communicates with a computing device and with a wireless communication device, a method for initiating a call between the wireless communication device and one or more recipient communication devices, the method comprising:

receiving, at the server, calling instructions from the computing device corresponding to the call that is to be initiated between the wireless communication device that is separate from the computing device and the one or more recipient communication devices, wherein the calling instructions have been generated at the computing device in response to user input at the computing device; and the server, upon receiving the calling instructions, initiating the call between the wireless communication device and the one or more recipient communication devices using the calling instructions to connect the wireless communication device and the one or more recipient communication devices in the call;

wherein initiating the call comprises the server transmitting the calling instructions to the wireless communication device, which uses the calling instructions to call the one or more recipient communication devices; and wherein transmitting the calling instructions includes communicating with another server that generates the first and second SMS messages containing the calling instructions and that are sent by the other server to the wireless communication device.

32. A method as recited in claim 31, wherein the server, before initiating the call, verifies that the computing device is authorized to generate the calling instructions for the wireless communication device.

33. In a wireless communication device that operates in a wireless communication network, a method for participating in a call with one or more recipient communication devices, the method comprising:

receiving calling instructions corresponding to the call that is to be initiated between the wireless communication device and the one or more recipient communication devices, the calling instructions having been generated at the computing device in response to user input at the computing device; and the wireless communication device, upon receiving the calling instructions, initiating the call between the wireless communication device and the one or more recipient communication devices using the calling instructions;

wherein initiating the call comprises directly calling the one or more recipient communication devices upon receiving the calling instructions.

34. A method as recited in claim 33, wherein the wireless communication device is a first mobile telephone; wherein the one or more recipient communication devices include a second mobile telephone having a telephone number; and wherein the first mobile telephone automatically calls the telephone number of the second mobile telephone in response to receiving the calling instructions.

35. A method as recited in claim 33, wherein the wireless communication device is a first mobile telephone; wherein the one or more recipient communication devices include a landline telephone having a telephone number; and wherein the first mobile telephone automatically calls the telephone number of the landline telephone in response to receiving the calling instructions.

36. A method as recited in claim 33, wherein the wireless communication device is a first mobile telephone; wherein the one or more recipient communication devices include a second telephone having a telephone number; and wherein the first mobile telephone automatically calls the telephone number of the second telephone in response to receiving the calling instructions.

* * * * *